UNITED STATES PATENT OFFICE.

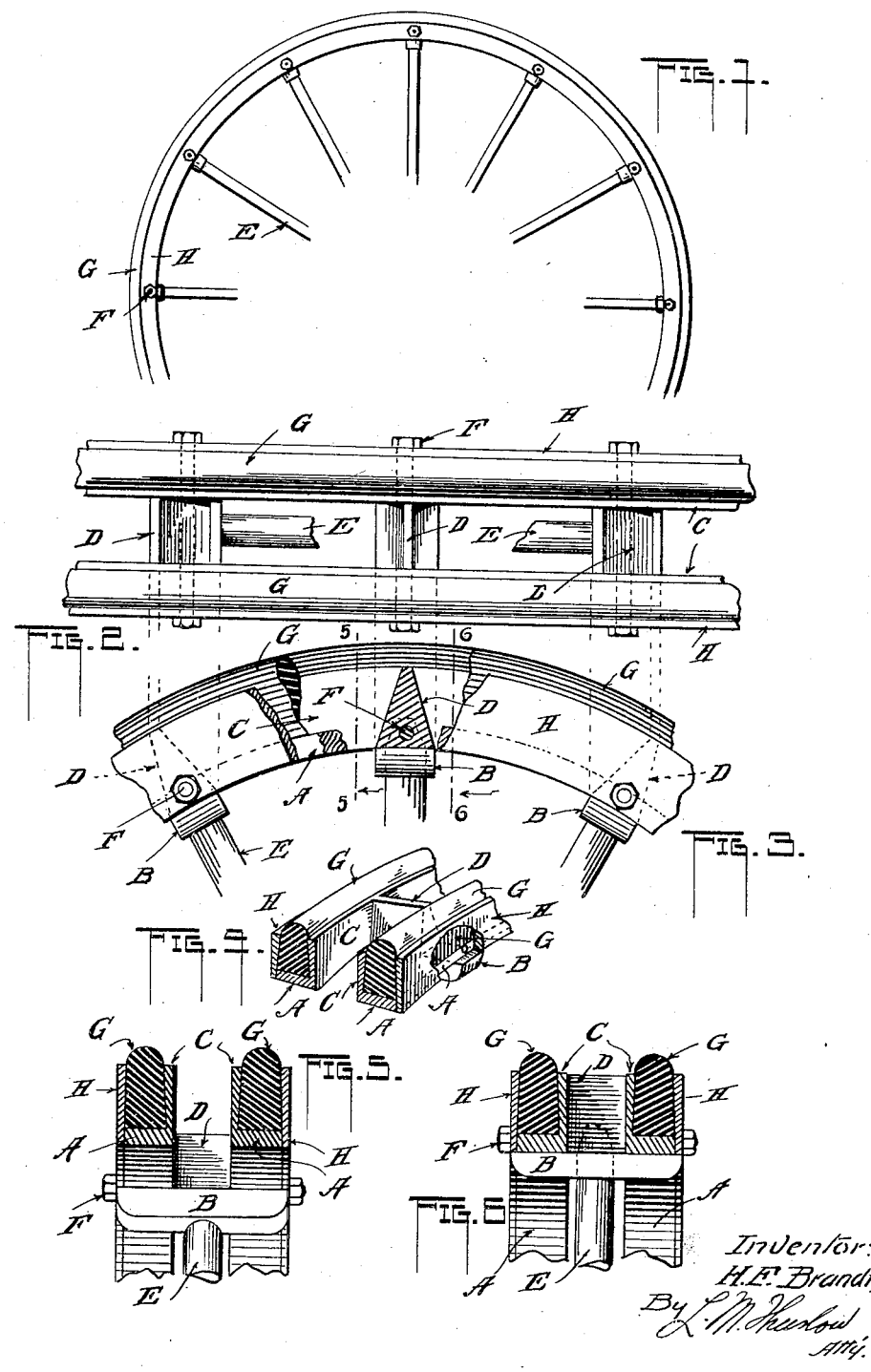

HENRY F. BRANDT, OF PEORIA, ILLINOIS.

VEHICLE-WHEEL.

1,354,163.  Specification of Letters Patent.  Patented Sept. 28, 1920.

Application filed October 13, 1919. Serial No. 330,459.

*To all whom it may concern:*

Be it known that I, HENRY F. BRANDT, a citizen of the United States, residing at Peoria, in the county of Peoria and State of Illinois, have invented certain new and useful Improvements in Vehicle-Wheels; and I do hereby declare that the following is a full, clear, and exact description of the invention, which will enable others skilled in the art to which it appertains to make and use the same.

This invention has reference to improvements in vehicle wheels being directed particularly to the treads thereof and their adaptation to all kinds of road surfaces.

The object of the invention is to furnish a wheel, particularly for delivery automobiles and automobile trucks, wherein its tire or tread will be adaptable for hard road surfaces and soft muddy roads, or in snow, without attention, either in attaching traction lugs or chains or the removal of such parts.

To the end that my invention may be readily understood the accompanying drawing is provided wherein, Figure 1 is a side elevation of a portion of a wheel involving my invention.

Fig. 2 is a plan of a wheel tread also showing my invention.

Fig. 3 is a side elevation of a portion of the wheel with parts broken away to better show the construction.

Fig. 4 shows a portion of the wheel-tire in perspective, and

Figs. 5 and 6 are cross sections of the wheel-tire on lines 5—5, and 6—6, respectively, of Fig. 3.

My purpose is to furnish a wheel for horseless vehicles in which the tire portion is adapted for all road conditions without requiring the attachment of anti-skid devices, the tire or tread being so constructed as to operate on hard roads or in heavy or muddy, or snow covered roads, with equal advantage.

A, A indicate the felly of my improved wheel, which includes two spaced portions as shown, connected by bridging portions B preferably integral therewith and connecting said spaced felly portions as clearly shown in Figs. 5 and 6.

The felly portion A includes a flange C perpendicular to the same, these flanges being also necessarily spaced from one another. The facing sides of the flanges may be parallel as shown but their opposite or inner sides are preferably "undercut" as by making them thicker at their outer edges for a purpose to be made known presently.

Connecting the flanges C at spaced intervals entirely around the wheel are webs D acting as ground-engaging "lugs" for traction purposes. These webs or lugs are preferably made integral with the flanges C and the bridging portions B described and are made wedge-shaped as clearly shown in section in Fig. 3, this form also being a matter of preference.

The said bridging portions B are provided with recesses in their under surfaces to receive the ends of the spokes denoted at E which extend into them also up into the webs D if desired as shown by dotted lines in Figs. 2 and 6 through which certain clamping bolts F may extend as will be explained later.

G, G indicate rubber tread portions adapted to seat on the felly portions A, the same being made wedge-shaped to fit into the undercut flanges C and also to fit removable outer flanges H also made similar to said flanges C as clearly shown in the last three figures.

The bridging portions B, as shown in Fig. 6 particularly, are extended beyond the felly portions A and the flanges H have an inner diameter such as to just slip over the ends of said portions B thus extended making a very stanch structure, the extensions serving to easily center or position said flanges.

When assembled as shown, the described clamping bolts F are passed through the fellies and the flanges as well as the webs or lugs D and the extremities of the spokes securing the whole in an exceedingly firm manner, the bolts being provided as usual with heads and securing nuts or other means to secure a permanent job.

Thus constructed and arranged, the rubber treads which, of course, may be made as broad as to tread-surface as desired, serve as the traction members and support for the vehicle upon hard road surfaces.

However, when the vehicle traverses soft deep roads of mud or even snow, the rubber treads will naturally sink into the same. This lets the lugs D into the road material serving as the traction members in the same capacity as chains or other forms of devices usually attached.

In this way the wheel is equipped for either type of road without requiring attention in any way as by the attachment of said devices.

On hard roads the lugs are held up from the surface being traversed, of course, and only take effect upon reaching the soft roads.

I may vary the construction of the parts slightly without departing from the spirit and intent of the invention and without getting beyond the terms of the appended claims.

By undercutting the flanges C and H the tread portions G, G are more securely held in place and short lengths thereof may be used which can be held as firmly as those of full length, or such as extend entirely around the wheel in one piece.

Since the rim portions or fellies are spaced apart the mud or snow passing in between the lugs D will clear itself by pushing through or between the same and out around the spokes. Thus the wheel is enabled to be cleared at all times of accumulations or rather materials that would tend to accumulate.

I claim:

1. In a vehicle wheel, a pair of rim portions each including a flange at one edge, spaced members integral with the rim portions securing them in rigid spaced relation, said members extending beyond the outer edges of the rim portions, a detachable flange engaging over the extensions of the members and supported upon them, a tread portion carried by each rim portion, means for clamping the tread portions in position and spaced lugs lying between the first named flanges inward from the tread surfaces of the said tread portions.

2. A vehicle wheel comprising in its construction with its spokes, a pair of spaced rims each having a flange at the inner side facing one another and having spaced webs independent of one another, lying between and integral with said rims and their flanges, each including an integral portion bridging the rims at their sides facing the axis of rotation, a detachable flange adapted to be secured to each rim at the outer side thereof, said bridging portion extending beyond each rim, their ends providing abutments to receive upon them the inner surfaces of the said flanges, each said bridging portion and its web adapted to receive into it the extremity of a wheel-spoke, and bolts for clamping the flanges upon the rim, each bolt extending through the flange and said rim, one of the bridging portions, and the spoke.

In testimony whereof I affix my signature in presence of two witnesses.

HENRY F. BRANDT.

Witnesses:
L. M. THURLOW,
L. O. EAGLETON.